US009454335B2

(12) United States Patent
Kaufman et al.

(10) Patent No.: US 9,454,335 B2
(45) Date of Patent: Sep. 27, 2016

(54) PRINTER FOR PRINTING LABELS, TAGS OR THE LIKE

(75) Inventors: Jeffrey R. Kaufman, Vernon Hills, IL (US); Victor Salmons, Gurnee, IL (US); Steven P. King, Palatine, IL (US); Bruce N. Alleshouse, Wilmette, IL (US); Bret M. Anno, Mundelein, IL (US)

(73) Assignee: ZIH CORP., Lincolnshire, IL (US)

( * ) Notice: Subject to any disclaimer, the term of this patent is extended or adjusted under 35 U.S.C. 154(b) by 2530 days.

(21) Appl. No.: 11/429,467

(22) Filed: May 5, 2006

(65) Prior Publication Data

US 2006/0279779 A1    Dec. 14, 2006

Related U.S. Application Data

(63) Continuation of application No. 09/642,538, filed on Aug. 18, 2000, now Pat. No. 7,126,716.

(60) Provisional application No. 60/149,966, filed on Aug. 20, 1999, provisional application No. 60/162,789, filed on Oct. 29, 1999.

(51) Int. Cl.
*G06K 15/00* (2006.01)
*G06F 3/12* (2006.01)
*B41J 3/407* (2006.01)
*B41J 3/44* (2006.01)

(52) U.S. Cl.
CPC ............ *G06F 3/1284* (2013.01); *B41J 3/4075* (2013.01); *B41J 3/44* (2013.01); *G06F 3/1207* (2013.01); *G06F 3/1229* (2013.01)

(58) Field of Classification Search
USPC ............. 358/1.13, 1.15, 1.16, 1.17; 715/700, 715/735; 270/52.02
See application file for complete search history.

(56) References Cited

U.S. PATENT DOCUMENTS

| 4,876,606 | A |   | 10/1989 | Banno et al. |
| 5,267,800 | A |   | 12/1993 | Petteruti et al. |
| 5,317,646 | A | * | 5/1994 | Sang et al. .................... 382/175 |
| 5,335,170 | A |   | 8/1994 | Petteruti et al. |

(Continued)

FOREIGN PATENT DOCUMENTS

EP    0872792    3/1998

OTHER PUBLICATIONS

European Search Report dated Sep. 16, 2002.

*Primary Examiner* — Thomas Lett

(57) ABSTRACT

A printer which is configured to automatically transmit data, such as critical and non-critical printer data, and route that data through at least one of a plurality of communication channels and services, such as via e-mail or mobile wireless equipment (e.g. an Internet-ready pager, a Personal Communications Service (PCS) phone or a wireless Personal Digital Assistant (PDA)). Preferably, the printer is configured such that it can be programmed and controlled from a remote location. Preferably, the printer is configured such that new label formats can be added from a remote location, and label formats stored in the printer can be viewed and modified from a remote location. Preferably, the printer is also configured such that barcode rendering algorithms can be downloaded to the printer from a remote location, and such that printer settings can be viewed and modified from a remote location, and thereafter can be downloaded to the printer and/or to other printers in a network to facilitate cloning.

13 Claims, 8 Drawing Sheets

(56) References Cited

U.S. PATENT DOCUMENTS

| | | |
|---|---|---|
| 5,524,993 A | 6/1996 | Durst |
| 5,537,626 A | 7/1996 | Kraslavsky et al. |
| 5,579,449 A | 11/1996 | Strobel |
| 5,594,860 A * | 1/1997 | Gauthier .................. 345/543 |
| 5,630,062 A * | 5/1997 | Okutsu ..................... 718/100 |
| 5,652,711 A * | 7/1997 | Vennekens ................ 358/1.17 |
| 5,727,135 A | 3/1998 | Webb et al. |
| 5,790,162 A | 8/1998 | Adams et al. |
| 5,806,993 A | 9/1998 | Petterutti et al. |
| 5,898,419 A * | 4/1999 | Liu .......................... 345/660 |
| 5,905,852 A * | 5/1999 | Love et al. ............... 358/1.15 |
| 5,976,720 A | 11/1999 | St. Jean et al. |
| 5,983,243 A * | 11/1999 | Heiney et al. ............. 715/235 |
| 5,997,193 A | 12/1999 | Petterutti et al. |
| 6,012,083 A * | 1/2000 | Savitzky et al. ........... 709/202 |
| 6,028,853 A | 2/2000 | Haartsen |
| 6,094,662 A | 7/2000 | Hawes |
| 6,184,996 B1 | 2/2001 | Gase |
| 6,209,048 B1 | 3/2001 | Wolff |
| 6,220,327 B1 | 4/2001 | Rothwell et al. |
| 6,233,408 B1 | 5/2001 | Allen |
| 6,236,486 B1 | 5/2001 | Nocker, IV |
| 6,244,319 B1 | 6/2001 | Maynard et al. |
| 6,283,188 B1 | 9/2001 | Maynard et al. |
| 6,292,595 B1 | 9/2001 | Petteruti et al. |
| 6,296,032 B1 | 10/2001 | Louie et al. |
| 6,327,677 B1 | 12/2001 | Garg et al. |
| 6,349,304 B1 * | 2/2002 | Boldt et al. ................ 707/102 |
| 6,389,544 B1 | 5/2002 | Katagiri |
| 6,405,178 B1 | 6/2002 | Manchala et al. |
| 6,496,859 B2 | 12/2002 | Roy et al. |
| 6,504,619 B1 | 1/2003 | Kageyama et al. |
| 6,587,647 B1 | 7/2003 | Watanabe et al. |
| 6,738,841 B1 * | 5/2004 | Wolff .......................... 710/62 |
| RE38,553 E | 7/2004 | Maynard et al. |
| 6,798,997 B1 | 9/2004 | Hayward et al. |
| 6,832,729 B1 | 12/2004 | Perry et al. |
| 6,857,013 B2 | 2/2005 | Ramberg et al. |
| 6,857,714 B2 | 2/2005 | Hohberger et al. |
| 6,889,263 B2 | 5/2005 | Motoyama |
| 6,942,403 B2 | 9/2005 | Hohberger et al. |
| 6,947,156 B1 | 9/2005 | Jeyachandran et al. |
| 6,952,276 B2 | 10/2005 | Sotokawa et al. |
| 6,965,441 B1 | 11/2005 | Haines et al. |
| 6,969,134 B2 | 11/2005 | Hohberger et al. |
| 7,112,001 B2 | 9/2006 | Hohberger et al. |
| 7,126,716 B1 | 10/2006 | Kaufman et al. |
| D538,225 S | 3/2007 | Lyman et al. |
| D538,226 S | 3/2007 | Lyman et al. |
| 7,201,343 B2 | 4/2007 | Mabit |
| D557,204 S | 12/2007 | Panebianco et al. |
| 7,306,386 B2 | 12/2007 | Lyman et al. |
| 7,425,887 B2 | 9/2008 | Tsirline et al. |
| 2002/0015166 A1 | 2/2002 | Wakai et al. |
| 2002/0144770 A1 | 10/2002 | Mabit |
| 2002/0196451 A1 * | 12/2002 | Schlonski et al. ............. 358/1.1 |
| 2003/0061947 A1 | 4/2003 | Hohberger et al. |
| 2003/0062119 A1 | 4/2003 | Hohberger et al. |
| 2003/0062131 A1 | 4/2003 | Hohberger et al. |
| 2003/0063001 A1 | 4/2003 | Hohberger et al. |
| 2003/0089754 A1 | 5/2003 | Mabit |
| 2006/0024114 A1 | 2/2006 | Lyman et al. |
| 2006/0028491 A1 | 2/2006 | Horrocks |
| 2006/0049253 A1 | 3/2006 | Butler |
| 2006/0092141 A1 | 5/2006 | Amani et al. |
| 2006/0102703 A1 | 5/2006 | Akhtar et al. |
| 2006/0249566 A1 | 11/2006 | Alleshouse |
| 2006/0279779 A1 | 12/2006 | Kaufman et al. |
| 2007/0013941 A1 | 1/2007 | Anno |
| 2007/0099462 A1 | 5/2007 | Helma et al. |
| 2007/0125859 A1 | 6/2007 | Alleshouse |

* cited by examiner

PRINTER FOR PRINTING LABELS, TAGS OR THE LIKE

CROSS-REFERENCE TO RELATED APPLICATIONS

This application is a continuation of U.S. application Ser. No. 09/642,538, filed Aug. 18, 2000, which is hereby incorporated herein in its entirety by reference. This application also claims the benefit of U.S. Provisional Application No. 60/149,966, filed Aug. 20, 1999 and U.S. Provisional Application No. 60/162,789, filed Oct. 29, 1999.

BACKGROUND

The present invention relates generally to printers which are configured to print labels, tags or the like, and more specifically relates to a printer which is configured to print labels, tags or the like and provides many advantages over the prior art.

It is advantageous to prevent printer downtime, or at least keep downtime to a minimum. Oftentimes, printers which print labels, tags or the like, such as barcode printers, are used in mission-critical applications. In such circumstances, when a printer goes down, it can be quite costly. For example, if a printer configured to print shipping labels runs out of ribbon or otherwise becomes effectively non-functional, it is possible that several hundred boxes will be placed into inventory without identification. In this case, every hour that the system or printer is unavailable can cost hundreds of thousands of dollars or more in lost productivity. Hence, it is advantageous to prevent printer downtime, and in mission-critical applications, it is generally economically imperative.

Prior art printers are not configured to automatically notify someone, such as an Information Technology (IT) manager who may not be located in close proximity to the printer, when there is a problem. As such, to keep downtime to a minimum, it is imperative to continually monitor a printer on site, and even then downtime may be substantial. For example, in the case where there is an assembly line with an industrial barcode printer at the end of the assembly line, and the ribbon of the printer runs out, the operators on the assembly line may or may not notice right away that the printer has run out of ribbon. Once the problem has finally been detected, it may take awhile for the new ribbon to be located and installed in the printer, resulting in substantial downtime for the assembly line.

Some prior art printers have a web-server therein which provides that an IT manager can remotely view a web page that contains some basic information about the printer. However, these prior art printers do not provide for the unsolicited transmission of critical and non-critical printer data and the routing of that data through a plurality of communication channels to an IT manager. For example, these printers do not automatically send important printer data to an IT manager via e-mail, an Internet-ready pager, a Personal Communications Service (PCS) phone or a wireless Personal Digital Assistant (PDA), thereby enabling the IT manager to respond to a problem or potential problem immediately, even though the IT manager may not have been actively monitoring the printer at the time. Instead, printers which have a web server therein are configured such that the IT manager must pro-actively monitor the printer and use a device which supports JAVA, such as a personal computer, to check on the status of the printer. Furthermore, even if a problem is detected by the IT manager in this manner, these printers do not provide that the IT manager can thereafter correct the problem by remotely interfacing with the printer. For example, prior art printers also do not provide that an IT manager can remotely access and modify a program which is operating within a printer's operating system. Therefore, if a change needs to be made to the program, the IT manager must access the program in the printer on site, using a computer connected to the printer's serial or parallel port, and this process must be repeated for each printer which the IT manager wants to re-program.

Still further, prior art printers do not provide that an IT manager can view and modify a label format from a remote location. Printers which are adapted to print labels, tags and the like, do so according to a pre-determined, pre-programmed format. For example, a printer which is configured to print shipping labels may be configured to print a shipping label in a format wherein the shipping company's logo, name and address is printed in the upper, left-hand corner of the label and the receiving company's name and address is printed at the center of the label. If the format of the label is to be changed (for example, if the shipping company's logo or address has changed), the IT manager must change the label format on site. After changing the label format, the IT manager typically has the printer print a label to determine whether the label looks acceptable. If not, the IT manager changes the format again, and has the printer print another label. This trial and error process may have to be repeated several times and may take a substantial amount of time. Additionally, if the IT manager wants to change the label format for several printers, the IT manager must repeat the process for each printer.

A still yet further object of the present invention is to provide a printer which is configured such that printer settings can be viewed and modified from a remote location, and thereafter can be downloaded to the printer and/or to other printers in a network.

Briefly, and in accordance with at least one of the foregoing objects, an embodiment of the present invention provides a printer which is configured to print labels, tags or the like, where the printer includes a housing and electronics in the housing configured to determine a condition of the printer (such as a printer error or warning condition) and thereafter automatically transmit data corresponding to the condition to a remote location, such as over an Intranet, the Internet and/or over a wireless communication network. Preferably, the printer transmits the data via e-mail, to an Internet-ready paging device, to a Personal Communications Service (PCS) phone and/or to a Personal Digital Assistant (PDA). By providing that the printer automatically transmits printer data, an IT manager can be alerted to a problem (i.e. warning condition or printer error) in the printer, and the IT manager can immediately take steps to correct the problem. Preferably, the printer is configured such that at least some problems can be corrected by the IT manager from the remote location by interfacing with the printer. However, some problems may require on site correction (such as if the printer is out of paper).

Preferably, the printer is programmable and controllable from a remote location over an Intranet, the Internet and/or over a wireless communication network. Preferably, the settings of the printer can be viewed and modified in this manner. Ideally, the printer is programmable and controllable using a web browser on a personal computer connected to an Intranet or to the Internet, and is configured to display web pages on a mobile device, such as a PDA or PCS phone.

Furthermore, preferably a label format which is stored in the printer can be viewed and modified from a remote location. Additionally, preferably the printer is configured such that a barcode rendering algorithm can be downloaded to the printer, preferably in the form of executable code.

Desirably, the printer is configured such it can control one or more peripheral devices in a stand-alone operation and acquire data, and can thereafter, without solicitation from a host, upload the data to the host (when the host is ready to receive the data) via e-mail or TCP/UDP Messaging. Preferably, the data is assembled into one or more databases and processed by the host in other applications.

Preferably, the printer is configured to transmit its settings to a remote location in XML format so that the printer settings are easy to read and are viewable using, for example, a web browser on a personal computer connected to the Intranet or the Internet. Thereafter, the settings can be modified and downloaded back to the printer, or can be downloaded to other printers in order to facilitate cloning. Preferably, the printer 10 is (and the other printers in the cloning process) are configured such that it parses out the data from the XML and re-sets its settings in accordance with the data which is parsed out of the XML.

Presently, there are many different barcode standards being used. Additionally, sometimes a barcode standard is changed (i.e. updated). Prior art barcode printers are configured such that an IT manager cannot remotely download a new or updated barcode rendering algorithm into the printer. Instead, prior art printers are typically sold having one or more barcode rendering algorithms resident therein and, in order to add or update a barcode rendering algorithm, an IT manager must obtain the necessary software, and load the new or updated barcode rendering algorithm into the printer on site, using a computer connected to the printer's serial or parallel port, and this process must be repeated for each printer. Additionally, prior art printers are not configured such that an IT manager can download a barcode rendering algorithm, such as from a printer manufacturer's web site, and thereafter download the barcode rendering algorithm to one or more printers.

Finally, prior art printers are not configured such that an IT manager can remotely access (i.e. upload) the settings of a printer, change the printer settings, and download the new printer settings to the printer or to other printers. Hence, the printer settings of prior art printers cannot be modified remotely, and prior art printers are not configured such that they can be cloned (i.e. to contain the same printer settings) quickly and easily from a remote location.

BRIEF SUMMARY OF THE INVENTION

An object of the present invention is to provide a printer which is configured to automatically transmit data, such as critical and non-critical printer data, and route that data through at least one of a plurality of communication channels and services, such as via e-mail or mobile wireless equipment (e.g. an Internet-ready pager, a Personal Communications Service (PCS) phone or a wireless Personal Digital Assistant (PDA)).

Another object of the present invention is to provide a printer which is configured such that it can be programmed and controlled from a remote location.

Still another object of the present invention is to provide a printer which is configured such that new label formats can be added from a remote location and label formats stored in the printer can be viewed and modified from a remote location.

A still yet other object of the present invention is to provide a printer which is configured such that barcode rendering algorithms can be downloaded to the printer.

BRIEF DESCRIPTION OF THE DRAWINGS

The organization and manner of the structure and function of the invention, together with further objects and advantages thereof, may be understood by reference to the following description taken in connection with the accompanying drawings, wherein.

DETAILED DESCRIPTION OF THE INVENTION

Figure 1:
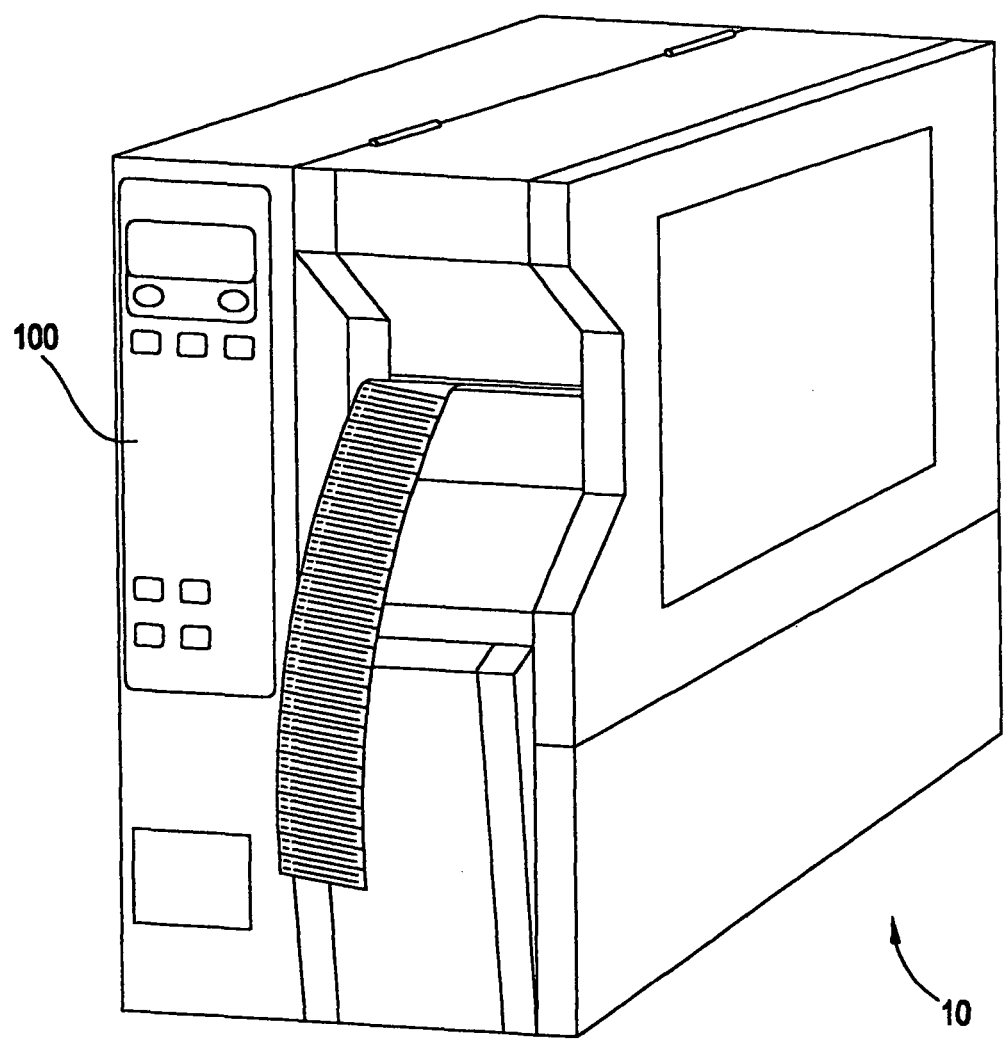
FIG. 1 is a perspective view of a printer which is in accordance with an embodiment of the present invention.

While the present invention may be susceptible to embodiment in different forms, there is shown in the drawings, and herein will be described in detail, an embodiment of the invention with the understanding that the present description is to be considered an exemplification of the principles of the invention and is not intended to limit the invention to that as illustrated and described herein.

FIG. 1 depicts a printer 10 in accordance with an embodiment of the present invention. As will be described in more detail hereinbelow, the printer 10 provides many advantages over the prior art. For example, as will be described, preferably the printer 10 is configured to automatically transmit data, such as critical and non-critical printer data, and route that data through at least one of a plurality of communication channels and services, such as via e-mail or mobile wireless equipment (e.g. an Internet-ready pager, a Personal Communications Service (PCS) phone or a wireless Personal Digital Assistant (PDA)). As such, a person, such as an IT manager, can remain apprised of the condition of the printer 10 without having to pro-actively monitor the printer 10.

Preferably, the printer 10 can also be programmed and controlled from a remote location and label formats stored therein can be viewed and modified from a remote location. Still further, the printer 10 is preferably configured such that barcode rendering algorithms can be downloaded to the printer, and printer settings can be viewed and modified from a remote location. Thereafter, the printer settings can be downloaded to the printer 10, or the printer settings can be downloaded to other printers in a network to facilitate cloning.

Figure 2:
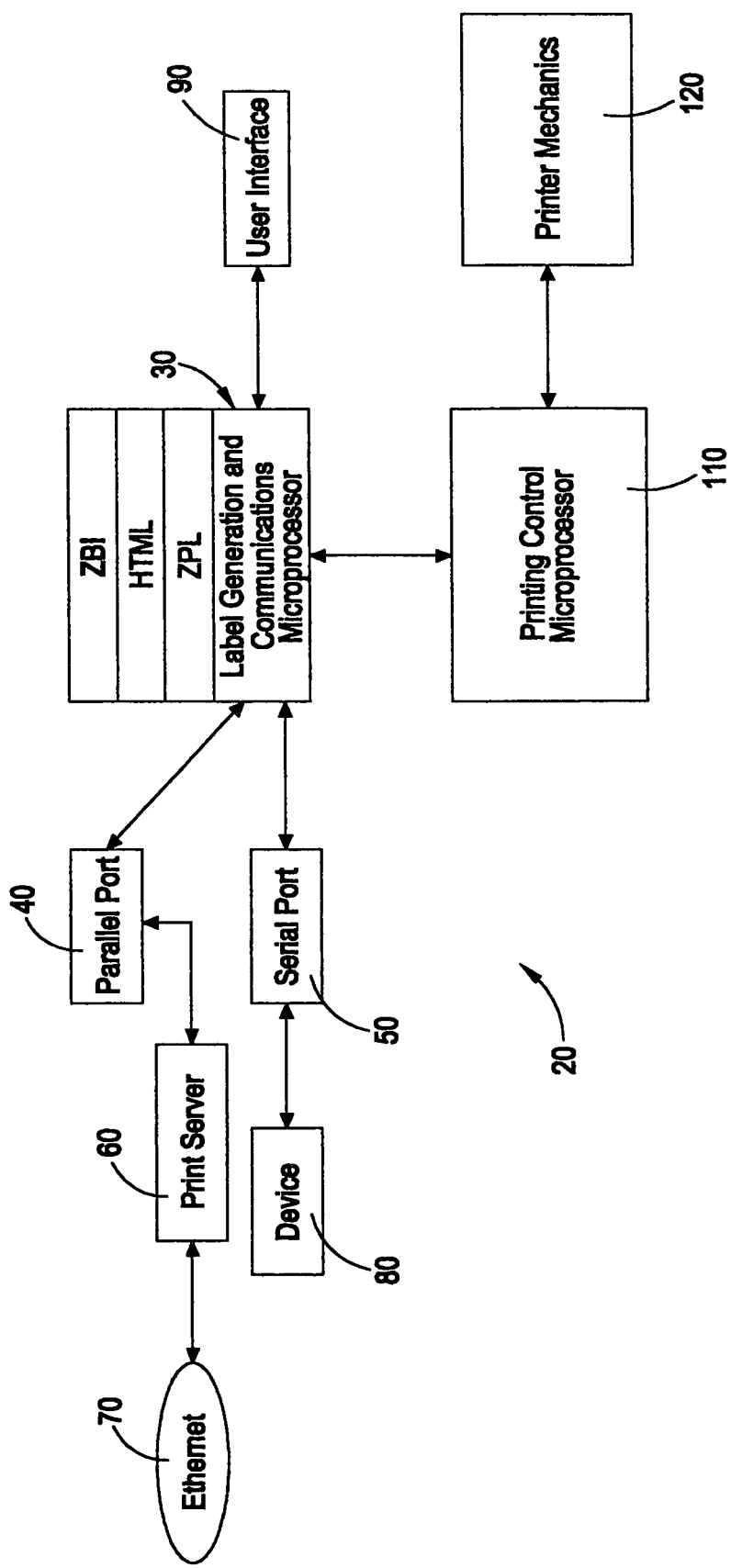
FIG. 2 is a schematic diagram of electronics of the printer shown in FIG. 1.
Figure 3:
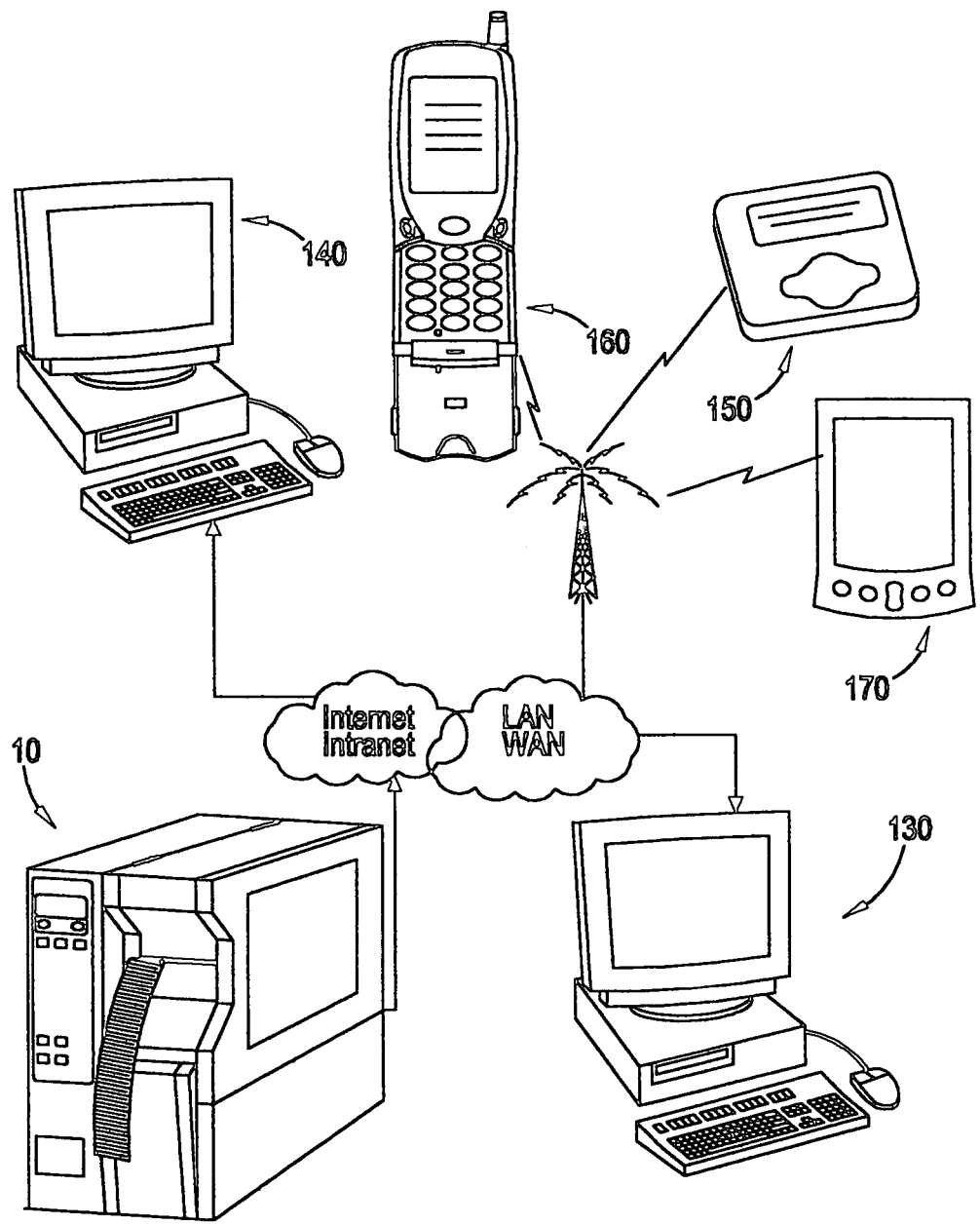
FIG. 3 is a diagram showing the printer of FIG. 1 interfaced with a personal computer at a remote location and interfaced with several mobile wireless devices, including an Internet-ready pager, a PCS phone and a PDA.

As shown in FIG. 2 which illustrates electronics 20 of the printer 10, the printer 10 includes a label generation and communications microprocessor 30 which communicates with a parallel port 40 and a serial port 50. Of course, other ports may also be provided on the printer 10 and these other ports may also be in communication with the label generation and communications microprocessor 30. As shown, a printserver 60 can be interfaced with the parallel port 40, and the printserver 60 may be connected to an Ethernet network 70 or some other type of network, which is thereafter connected to an Intranet and/or to the Internet, as shown in FIG. 3. A device 80 such as a personal computer, programmable logic controller (PLC), weigh scale, barcode scanner or other type of device may be connected to the serial port 50 for providing the printer 10 a data stream which the printer 10 uses to print tags, labels or the like.

The label generation and communications microprocessor 30 communicates with a user interface 90 which consists of buttons and switches which are disposed mainly on the front panel 100 of the printer 10 (see FIG. 1). The label generation and communications microprocessor 30 also communicates with a printing control microprocessor 110. The printing control microprocessor 110 is in communication with printer mechanics 120 which are generally conventional and well known in the art, and controls the printer mechanics 120 to print tags, labels or the like depending on information the printing control microprocessor 110 receives from the label generation and communications microprocessor 30.

Preferably, the printing control microprocessor 110 is configured to monitor certain components and aspects of the printer mechanics 120, determine whether there is a warning condition, printer error or other problem, and report to the label generation and communications microprocessor 30. For example, preferably the printing control microprocessor 110 is configured to determine whether the printer 10 has run out of paper, is off or on line, has run out of ribbon, whether the print head is open or is getting too hot, etc. This type of monitoring is generally well known in the art. The configuration of the label generation and communications microprocessor 30 and the fact that the printing control microprocessor 110 monitors the printer mechanics 120 and the printer 10 is connected to an Intranet and/or to the Internet (see FIG. 3) provides that the printer 10 can automatically transmit critical and non-critical printer information to one or more remote devices such as, as shown in FIG. 3, to a personal computer 130, 140 connected to an Intranet or to the Internet, or to an Internet-ready pager 150, a PCS phone 160 and/or a PDA 170, over a wireless communication network. This will be described in more detail later herein.

Preferably, the label generation and communications microprocessor 30 is configured to be programmed and controlled using a pre-determined programming language (identified as "ZPL" in FIG. 2). As will be described more fully later herein, preferably the printer 10 is configured such that the printer can be programmed and controlled from a remote location, such as over an Intranet, the Internet or over a wireless communications network.

Preferably, the label generation and communications microprocessor 30 includes a web-server (which is generally embedded within the printer's operation system) which is configured to communicate in Hyper Text Markup Language (HTML) (identified as "HTML" in FIG. 2) to facilitate the display of web pages over an Intranet, the Internet or over a wireless communication network. As will be described more fully later herein, this provides that a person, such as an IT manager, can view printer settings and can program and control the printer 10 from a remote location using a web browser. Preferably, the printer is configured to provide the data in a simple format which does not require that the receiving device support JAVA. As such, the data can be readily processed and displayed by a pager 150, PCS phone 160 or PDA 170 which may not support JAVA.

Preferably, the printer 10 includes a program and corresponding firmware (identified as "ZBI" in FIG. 2) which is configured to convert a data stream from one format to another, thereby providing that the printer 10 is compatible with a plurality of different data stream formats. Specifically, the label generation and communications microprocessor 30 receives a data stream, for example, through the serial port 50, such as from a personal computer, weigh scale or barcode scanner. The ZBI may then convert the data stream from one format which would otherwise be incompatible with the printer 10 into another format which is compatible with the printer 10. The label generation and communications microprocessor 30 then uses the converted data to format a label, tag or the like, and communicates with the printing control microprocessor 110 which thereafter controls the printer mechanics 120 in order to print the label, tag or the like in accordance with the format. U.S. Provisional Application Ser. No. 60/162,789 discloses the ZBI in more detail, and this application is hereby incorporated herein in its entirety by reference.

More specifically, a printer may be configured to receive a data stream, e.g., through a port. The data stream contains information that defines the format and a content of the label, tag, etc. to be printed. For example, the data stream may contain variable data (e.g., the content of the label such as a company's name, address, phone, vendor ID and container ID) and fixed information (e.g., font and location of printed). The printer may use the data stream to generate a bit map. The printer may then print a label, tag, etc, according to the bit map.

It is typical for each printer company to have its own data format. Some of the existing data stream forms are: BASIC, IPL (Intermec Printer Language), Datamax Printer Language, Sato Printer Language, ZPL (Zebra Programming Language), EPL (Eltron Programming Language), QMS and EPOS (Epson Point of Sale). A printer may be configured to print label, tags or like based on a first data format, such as ZPL. However, the printer may receive the data stream in a second data format, such as EPOS or QMS, from a remote device (which may be a second printer that uses the second data format, etc.). The printer, e.g., an interpreter of the printer, may be further configured to convert the data stream in the second data format into the first data format. For example, the printer may be configured to identify and remove the variable data of the data stream in the first data format; and correlate the removed variable data with fields of variable data according to the second data format.

In some embodiments, the printer may be configured to create a command (e.g., an upload network graphics command) to upload from the printer graphic objects (e.g., images, etc.) in any supported format (such as, e.g., HTML, XML, etc.). The printer can provide an enhanced host status mechanism, which allows the printer to provide, e.g., HTML pages that can be viewed in a web browser. In addition to viewing the status of the printer, the web pages can allow the user to change the printer's configuration settings and view and manipulate objects stored within the printer's memory. For example, a bitmap of an image stored on the printer's memory can be converted to HTML or other format, uploaded to remote device via the internet (using, e.g., data stream protocols known by those skilled in the art), and viewed using a web browser on handheld device (e.g., PDA) or other computing device. Information based on variable data (such as manufacturer name, logo, etc.) can be uploaded to a remote device via the web.

As discussed above, preferably the printer 10 is configured such that the printer 10 can interface with a device at a remote location via e-mail or TCP/UDP over an Intranet, the Internet or over a wireless communication network. This will now be described in more detail.

As described above, preferably the printer 10 is configured to display web pages over an Intranet, the Internet or over a wireless communication network. Preferably, one of the web pages is configured such that the user can select conditions (such as printer error or warning conditions) of which the user wants to be alerted, and can select how he or she wants to be alerted. Specifically, preferably the web page is configured such that the user can select a condition and can select e-mail and provide the web site with his or her e-mail address, can select PCS phone and provide the web site with his or her phone number, can select pager and provide the web site with the pager number, or can select to be alerted in some other manner via a corporate local area network (LAN) or wide-area network (WAN). Thereafter, if the printer 10 (i.e. the printing control microprocessor 110) detects the condition, the printer 10 alerts the user of the condition via the means chosen (i.e. sends the user an e-mail, calls the person and displays information on the screen of the PCS phone, pages the person and displays information on the screen of the pager, or alerts the person in some manner via the corporate LAN or WAN) (see FIG. 3). This provides that the user, such as an IT manager, need not pro-actively monitor the printer 10, and the printer 10 will automatically and immediately inform the user of printer errors or warning conditions via the selected communication channel. Preferably, the web page provides that the user can also elect to be alerted that a condition has been cleared (i.e. a warning condition or printer error which has been detected by the printer 10 has been since corrected). This is advantageous because it may prevent the user, such as an IT manager, from spending time trying to correct a problem which has already been corrected, such as by personnel who are on site at the printer 10. Preferably, another web page is configured such that the user can view the printer's configuration.

Preferably, other web pages are configured such that the user can view and modify printer settings, for example, the printer's general setup, serial communications setup, network communications setup, media setup, calibration, as well as view and modify other printer settings. Additionally, preferably the user can direct the web page to have the printer 10 print its settings onto a tag, label or the like for viewing on site. Preferably, the web pages are configured such that the user must enter a password to adjust the printer's settings. With regard to the media setup, preferably the user can specify the media type and sensor type as well as the print method and the print width and maximum length within acceptable ranges.

Figure 4:
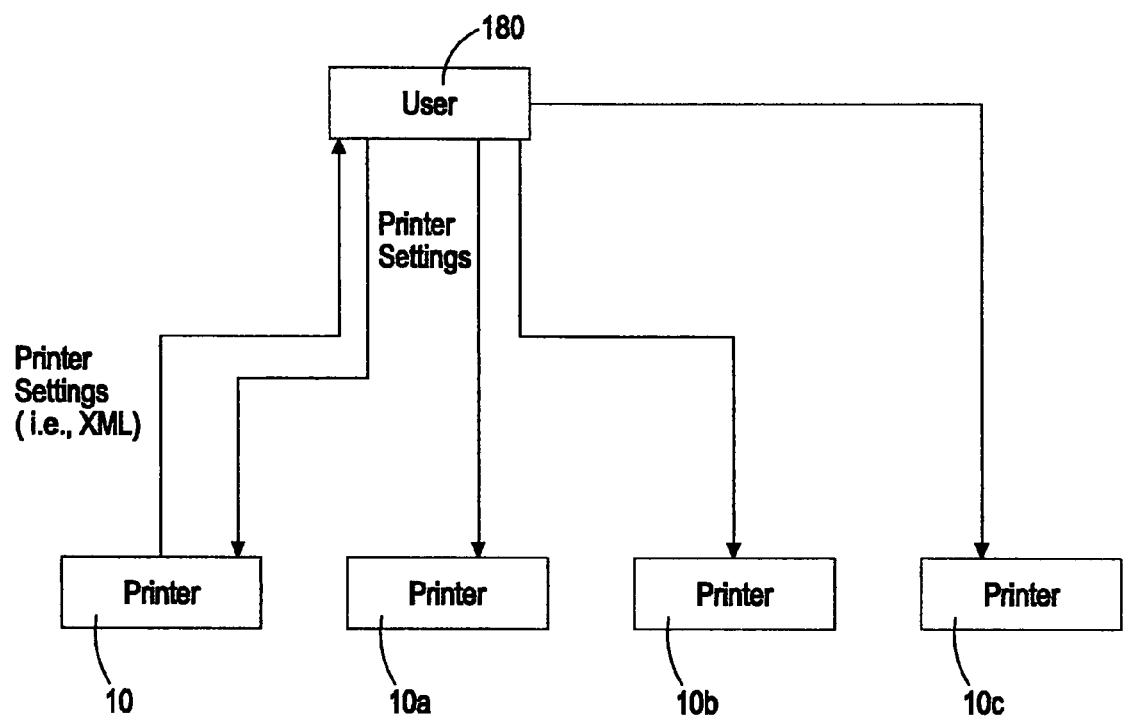
FIG. 4 is a schematic diagram showing a user uploading the settings of the printer of FIG. 1, viewing and modifying the settings using, for example, a web browser, and thereafter downloading the settings back to the printer, or to other printers in the network to facilitate cloning.

Preferably, as shown in FIG. 4, the printer 10 is configured such that a user 180 can upload the printer's settings in a format such as XML, can view and modify the settings using a web browser, and can thereafter download the settings back to the printer 10, or to other printers (10a, 10b, 10c, etc.) in the network to facilitate cloning.

Preferably, a web page of the printer 10 is configured such that the user can view the status of memory in the printer 10 and can view a directory listing of different objects which are stored in and used by the printer 10 (i.e. used by the label generation and communications microprocessor 30 and/or the printing control microprocessor 110). Such listings may include programs which run in the printer's operating system, as well as graphic images, fonts, label formats and programs relating to the ZBI (discussed hereinabove).

Figure 5:
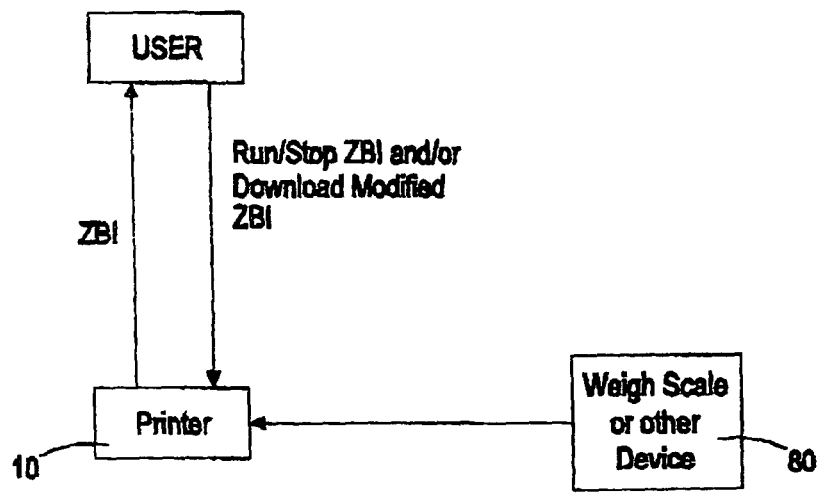
FIG. 5 is a diagram showing a user uploading, modifying and downloading ZBI, and running/stopping ZBI from a remote location.

Preferably, the printer 10 is configured such that the user can direct the printer to stop or ran a program, and can add or modify an existing program, wherein the new or modified program is thereafter downloaded to the printer 10 and the printer 10 becomes effectively re-programmed. Preferably, the web pages are configured such that the user must enter a password to add, run, stop or modify any of the programs. FIG. 5 illustrates a user controlling (i.e. running or stopping) the ZBI from a remote location as well as uploading the ZBI, modifying the ZBI and downloading the modified ZBI to the printer. Preferably, the printer 10 is configured to display the ZBI in the form of a web page at a remote location and provides that a user can direct the ZBI to open TCP/UDP or e-mail ports to the Internet or an intranet to send messages to or from the printer for communicating with other systems on the Internet or intranet.

Figure 6:
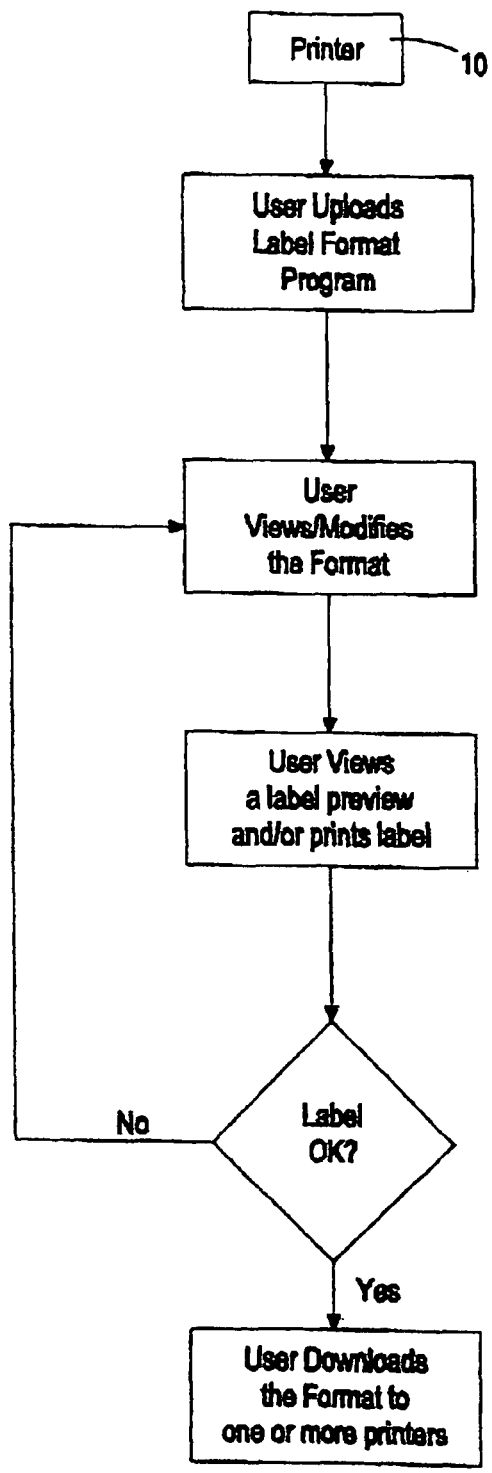
FIG. 6 is a block diagram of a process wherein a user uploads a program which is stored in the printer which the printer uses to print a label, views and modifies the program, and views how the label would look if it were printed and/or prints out the label, and downloads the modified program back to the printer.

With regard to label formats, as shown in FIG. 6, preferably the printer 10 is configured such that a user can upload (see FIG. 3) label formats which are stored in the printer 10 which the printer 10 uses to print labels, and can thereafter view and modify the format. Preferably, the printer 10 is configured such that after modifying the format, the user can direct the web page (i.e. the printer) to display how the label would look if it were actually printed by the printer (i.e. a label preview), or can direct the printer to actually print the label. If the label does not look as desired, the user can further modify the format and again view a label preview or print the label until the label looks as desired. Then, the user can direct the web site to download the modified, finalized format to the printer 10 (or to one or more other printers) which thereafter uses the modified format to print labels, tags or the like. Preferably, the printer 10 and web pages are also configured such that the user can format a new label and can download the new label format to the printer for use.

Although the printer 10 is preferably configured such that web pages can be viewed using a web browser, the printer 10 may also be configured to communicate over an Intranet or the Internet (see FIG. 3) with a computer which is running a utility program which is specifically directed at monitoring the printer 10 and provides for the centralized management of a plurality of printers in a network.

Figure 7:
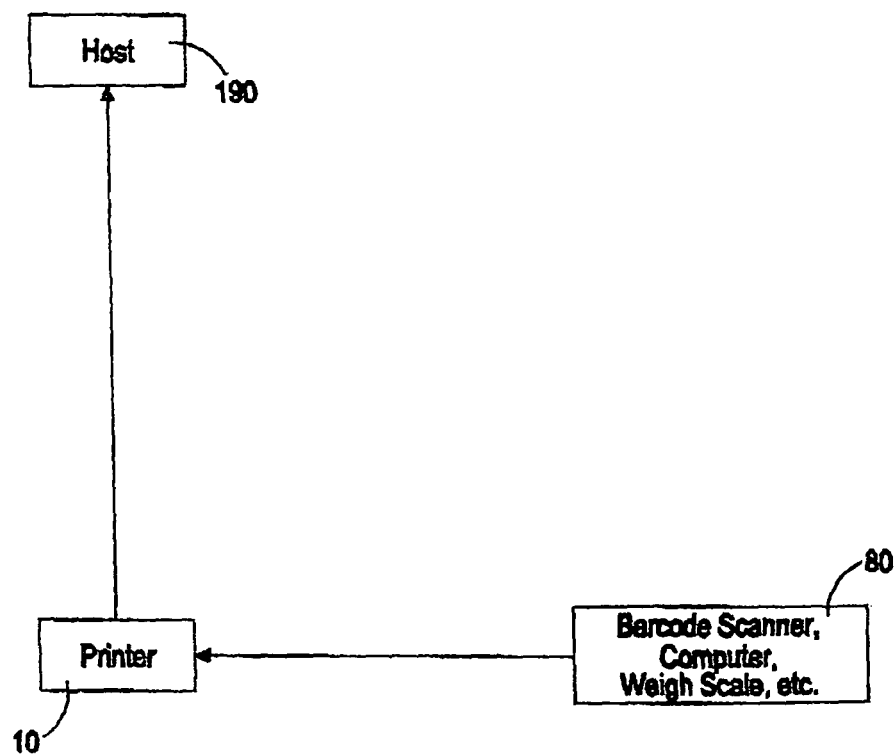
FIG. 7 is a diagram showing the printer of FIG. 1 connected to a host computer, and showing the printer uploading data to the host.

As discussed above and as shown in FIG. 7, desirably the printer 10 is configured such that the printer 10 can process data in a stand-alone application, such as by receiving data through the serial port 50 (see FIG. 2) and acting on the information by printing tags, labels or the like, and can thereafter, without solicitation from a host 190, upload the processed data to the host 190 when the host is ready to receive the data.

Figure 8:
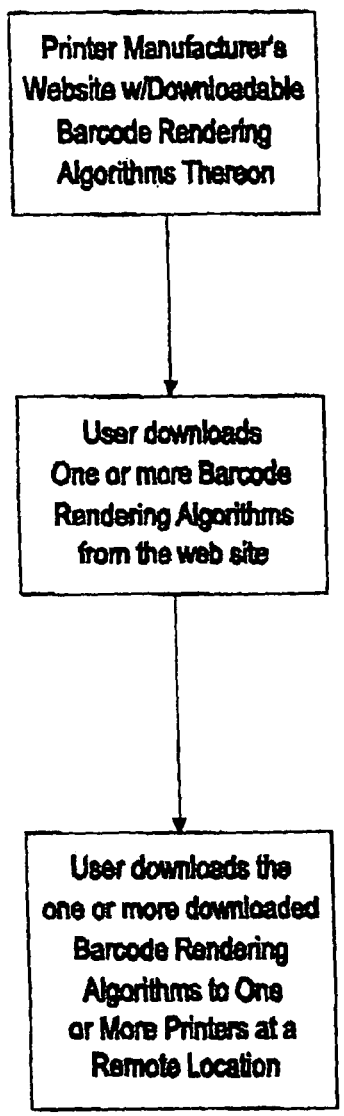
FIG. 8 is a diagram showing a user downloading barcode rendering algorithms from a web site, such as the web site of a printer manufacturer, and thereafter downloading the barcode rendering algorithms to several printers.

Preferably, as shown in FIG. 8, the printer is configured such that a user can download barcode rendering algorithms to the printer for the printer to use in interpreting data streams and generating a barcode. Preferably, the printer and web pages are configured such that a user can download barcode rendering algorithms, such as from a printer manufacturer's web site, and can thereafter download the barcode rendering algorithms to the printer. As such, it is easy for the user to keep the printer updated with regard to new or updated barcode standards, and can do so from a remote location. Preferably, the printer is configured such that the barcode rendering algorithms can be downloaded to the printer in the form of executable code, and the printer can execute the code to print a barcode from a stream of data, which is possibly received by the printer through the serial port 50 (see FIG. 2).

As set forth above, U.S. Provisional Application No. 60/162,789 has been incorporated herein by reference. U.S. Provisional Application No. 60/149,966 is also hereby incorporated in its entirety by reference in that the application contains additional disclosure about the present invention.

While an embodiment of the present invention is shown and described, it is envisioned that those skilled in the art may devise various modifications without departing from the spirit and scope of the foregoing description.

The invention claimed is:

1. A printer comprising:
  a port configured to receive a data stream according to a first format, the data stream comprising a set of commands representing a bitmap; and
  at least one processor configured to convert the data stream from the first format to a second format and to generate the bitmap based on the data stream being in the second format, wherein the at least one processor is further configured to transmit a graphical representation of the bitmap generated based on the data stream being in the second format to a remote location, and wherein the graphical representation is formatted by the at least one processor for subsequent display on a handheld device.

2. A system comprising:
  a first printer and a second printer, the first printer comprising:
    a port configured to receive a data stream according to a first format, the data stream comprising a set of commands representing a bitmap;
    at least one processor configured to convert the data stream from the first format to a second format and to generate the bitmap based on the data stream being in the second format; and
    a memory element storing a program accessible by the at least one processor and storing the bitmap generated based on the data stream being in the second format;
    wherein the at least one processor is further configured to modify the bitmap according to one or more instructions transmitted by the second printer.

3. The first printer according to claim 2, wherein the at least one processor is configured to transmit the bitmap as a data stream according to a third format.

4. The first printer according to claim 3, wherein the third format is in either a XML or HTML format.

5. The first printer according to claim 2 further comprising one or more printer mechanics configured to print a label and wherein the at least one processor is configured to control the printer mechanics to print the label according to the bitmap.

6. A printer comprising:
  a port configured to receive a data stream according to a first format, the data stream comprising a set of commands representing a bitmap; and
  at least one processor configured to convert the data stream from the first format to a second format and to generate the bitmap based on the data stream being in the second format;
    wherein the data stream according to the first format includes variable data and the at least one processor is further configured to:
      identify the variable data of the data stream in the first format;
      correlate the variable data with one or more fields of variable data according to the second format; and
      transmit the bitmap as a webpage.

7. The printer according to claim 6, wherein the at least one processor is configured to transmit the bitmap as a data stream according to a third format.

8. The printer according to claim 7, wherein the third format is in either a XML or HTML format.

9. A method comprising:
  receiving, by a printer, a data stream in a first format, the data stream comprising a set of commands representing a bit map;
  converting, by a printer, the data stream from the first format to a second format, including identifying variable data of the data stream in the first format, and correlating the variable data with one or more fields of variable data according to the second format;
  generating, by a printer, a bit map according to the data stream in the second format; and
  sending, by the printer, a graphical representation of the bit map generated according to the data stream in the second format to a remote location.

10. The method according to claim 9, wherein the sending of the graphical representation including sending the graphical representation as a part of a web page.

11. The method according to claim 10 further comprising receiving, by the printer, one or more instructions to modify the bit map generated according to the data stream in the second format from the remote location and modifying the bit map according to the one or more instructions.

12. The method according to claim 9, wherein the sending of the graphical representation including sending the graphical representation as a data stream according to a third format.

13. The method according to claim 12 further comprising printing, by the printer, a label according to the bit map.

* * * * *